(12) United States Patent
Hamilton

(10) Patent No.: US 12,388,777 B2
(45) Date of Patent: Aug. 12, 2025

(54) SPAM FORECASTING AND PREEMPTIVE BLOCKING OF PREDICTED SPAM ORIGINS

(71) Applicant: State Farm Mutual Automobile Insurance Company, Bloomington, IL (US)

(72) Inventor: Jason Hamilton, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 17/856,838

(22) Filed: Jul. 1, 2022

(65) Prior Publication Data

US 2023/0006956 A1 Jan. 5, 2023

Related U.S. Application Data

(60) Provisional application No. 63/217,676, filed on Jul. 1, 2021.

(51) Int. Cl.
*H04L 51/212* (2022.01)
(52) U.S. Cl.
CPC .................. *H04L 51/212* (2022.05)
(58) Field of Classification Search
CPC ..................................... H04L 51/212
See application file for complete search history.

(56) References Cited

U.S. PATENT DOCUMENTS

| 7,487,217 | B2 | 2/2009 | Buckingham et al. |
| 7,689,652 | B2 | 3/2010 | Mishra et al. |
| 7,899,866 | B1 | 3/2011 | Buckingham et al. |
| 7,904,958 | B2 | 3/2011 | Lee |
| 9,762,618 | B2 | 9/2017 | Goldstein |
| 10,027,688 | B2 | 7/2018 | Perdisci et al. |
| 2005/0198518 | A1* | 9/2005 | Kogan ............... H04L 63/1441 713/188 |

(Continued)

OTHER PUBLICATIONS

Burt, Tom, "New action to disrupt world's largest online criminal network", The Official Microsoft Blog, Mar. 10, 2020, retrieved from the internet at https://blogs.microsoft.com/on-the-issues/2020/03/10/necurs-botnet-cyber-crime-disrupt/ on Dec. 15, 2020, 2 pages.

*Primary Examiner* — Suraj M Joshi
(74) *Attorney, Agent, or Firm* — Lee & Hayes, P.C.

(57) ABSTRACT

A system is configured to analyze large volumes of sample emails from past spam campaigns to identify homogeneous features, as well as systematically heterogeneous features, which spam originators fail to obfuscate. By extracting origin-referencing features therefrom, the system predicts that spam originators will mass-acquire domain names at certain registrars for the purpose of future spam floods, and repeatedly and periodically analyzes domain name records on an automated basis to identify domain names which will imminently be utilized as spam origins. Since it may be necessary to block tens of thousands of domains preemptively to avert spam floods, performance of such large-scale analysis by a computing system allows spam origins to be predicted on a timely basis within a day of spam floods being deployed, and domain lists to be generated and configured responsively in time to prevent the spam floods.

20 Claims, 5 Drawing Sheets

(56) References Cited

U.S. PATENT DOCUMENTS

| | | | |
|---|---|---|---|
| 2006/0168041 A1* | 7/2006 | Mishra | H04L 51/48 |
| | | | 709/206 |
| 2009/0006569 A1* | 1/2009 | Morss | H04L 51/212 |
| | | | 709/206 |
| 2009/0037469 A1* | 2/2009 | Kirsch | H04L 51/212 |
| 2011/0119342 A1 | 5/2011 | Shuster | |
| 2012/0131107 A1 | 5/2012 | Yost | |
| 2013/0282477 A1 | 10/2013 | Gould et al. | |
| 2016/0119282 A1* | 4/2016 | Bladel | G06Q 30/0609 |
| | | | 709/203 |
| 2018/0219829 A1* | 8/2018 | Kebinger | H04L 51/48 |
| 2018/0219830 A1* | 8/2018 | O'Brien | H04L 61/5007 |

* cited by examiner

DETERMINE EMAIL SAMPLES OF PAST SPAM CAMPAIGN
502

FIG. 5A

IDENTIFY ONE OR MORE HOMOGENEOUS FEATURES ACROSS EMAIL SAMPLES; IDENTIFY ONE OR MORE SYSTEMATICALLY HETEROGENEOUS FEATURES; IDENTIFY SET OF EMAIL SAMPLES AS SUBSTANTIALLY HOMOGENEOUS
504

COMPARE ORIGIN-REFERENCING FEATURES OF SUBSTANTIALLY HOMOGENEOUS EMAIL SAMPLES AGAINST DOMAIN NAME RECORDS TO DETERMINE HOMOGENEOUSLY ORIGIN-REFERENCING FEATURES AND PREDICT FUTURE HOMOGENEOUS SPAM ORIGIN DESCRIPTORS
506

WRITE DOMAIN MATCHING EXPRESSIONS BASED ON HOMOGENEOUSLY ORIGIN-REFERENCING FEATURES, BASED ON PREDICTED FUTURE HOMOGENEOUS SPAM ORIGIN DESCRIPTORS, AND BASED ON TIME-SENSITIVE HOMOGENEOUS FEATURES
508

CONFIGURE A MAIL SCANNER RUNNING ON A PROXY SERVER TO BLOCK EMAILS ACCORDING TO DISTRIBUTED DOMAIN LIST
510

FIG. 5C

SPAM FORECASTING AND PREEMPTIVE BLOCKING OF PREDICTED SPAM ORIGINS

RELATED APPLICATIONS

This application claims the benefit of and is a non-provisional of U.S. Patent Application No. 63/217,676, filed Jul. 1, 2021, and entitled "SPAM FORECASTING AND PREEMPTIVE BLOCKING OF PREDICTED SPAM ORIGINS," the disclosure of which is incorporated by reference herein in its entirety for all purposes.

TECHNICAL FIELD

The present disclosure relates to using features of past spam email campaigns which reference spam origins, compared against domain name records, to predict future spam origin descriptors and identify future spam origins as a basis for configuring a domain list to preemptively block origins of future spam campaigns, without depending on reputation and content-based blocking.

BACKGROUND

The blocking of unsolicited email (spam) is conventionally achieved by developing reputation records and content analysis based on content of spam email specimens. Both are reactive and based on what has been seen before. Persistent spammers often switch cloud providers and switch domains to defeat reputation records. Similarly, automation can alter phrases contained in spam emails to defeat content analysis. Some spam targets have blocked IP addresses based on the assigned country, but that is only moderately effective since a spammer can rent a server in another country. Thus, there are currently cyclic traditional anti-spam efforts in which attackers start a spam campaign; defenders key on criteria like the sending IP address, sending email address, email subject, or phrases in the body of the email to block future spam without impacting wanted messages; attackers send from a new, unblocked domain, with new subjects and variants of the phrases in the email body; defenders block the new criteria; and the cycle continues.

Email spam attacks typically direct spam to both valid and invalid email addresses. When spam attacks reach valid email addresses, the spam disrupts recipients' workflow and generates additional work for the recipients and email security teams. When spam attacks are directed to invalid email addresses, email infrastructure, including outbound email scanners are often flooded by non-deliverables from Exchange servers, which in turn causes legitimate outbound emails to be delayed. Accordingly, there is an opportunity to improve anti-spam measures.

SUMMARY

This disclosure describes techniques, systems, methods, and computer-executable instructions on computer-readable media for applying publicly available intelligence to anti-spam measures to proactively defend against spam campaigns. Aspects can include identifying email samples of past spam campaigns, compiling domain name records from a DNS records source, predicting future homogeneous spam origin descriptors, identifying predicted spam origins, and configuring a mail proxy server to block future emails from the predicted spam origins.

According to a first aspect, an anti-spam system can include one or more processing units and one or more computer-readable media storing computer-executable instructions that, when executed by the one or more processing units, cause the one or more processing units to perform operations to block an email spam campaign preemptively. The operations can include comparing origin-referencing features of a set of substantially homogeneous email samples against compiled domain name records from a DNS records source to predict homogeneous spam origin descriptors; and matching the predicted homogeneous spam origin descriptors and time-sensitive homogeneous features against the compiled domain name records to identify predicted spam origins among matched domain name records.

In some examples associated with the first aspect, the operations can include determining email samples of a past spam campaign; identifying one or more homogeneous features across a set of the email samples; identifying one or more systematically heterogeneous features across the set of the email samples; and identifying the set of email samples as substantially homogeneous.

In some examples associated with the first aspect, the one or more homogeneous features can include at least one of: a first set of recipient addresses in email samples of a first past spam campaign being substantially homogeneous with a second set of recipient addresses in email samples of a second past spam campaign; a TLD in sender addresses being substantially homogeneous across intra-campaign sample of a same past spam campaign; and a TLD in sender addresses being substantially homogeneous across inter-campaign samples of different past spam campaigns.

In some examples associated with the first aspect, the one or more systematically heterogeneous features can include at least one of: domain names in sender addresses being systematically heterogeneous across intra-campaign samples and inter-campaign samples in containing non-dictionary words; domain names in sender addresses being systematically heterogeneous across intra-campaign samples and inter-campaign samples in mismatching email body content; and domain names in sender addresses being systematically heterogeneous across intra-campaign samples and inter-campaign samples in including heterogeneous subdomains.

In some examples associated with the first aspect, the operations can include: compiling the domain name records in accordance with one or more homogeneously origin-referencing features of substantially homogeneous email samples; and determining additional homogeneously origin-referencing features based on comparing the origin-referencing features against the compiled domain name records.

In some examples associated with the first aspect, the operations can include: writing domain matching expressions based on predicted future homogeneous spam origin descriptors and time-sensitive homogeneous features; and matching the predicted homogeneous spam origin descriptors and time-sensitive homogeneous features against the compiled domain name records comprises applying the domain matching expressions against the compiled domain name records.

In some examples associated with the first aspect, the operations can include: generating a domain list based on the predicted spam origins; distributing the domain list to a proxy server; and configuring a mail scanner running on the proxy server to block emails according to the distributed domain list.

According to a second aspect, a computer-implemented method of blocking an email spam campaign can include operations. The operations can include comparing origin-referencing features of a set of substantially homogeneous email samples against compiled domain name records from a DNS records source to predict homogeneous spam origin descriptors; and matching the predicted homogeneous spam origin descriptors and time-sensitive homogeneous features against the compiled domain name records to identify predicted spam origins among matched domain name records.

In some examples associated with the second aspect, the operations can include determining email samples of a past spam campaign; identifying one or more homogeneous features across a set of the email samples; identifying one or more systematically heterogeneous features across the set of the email samples; and identifying the set of email samples as substantially homogeneous.

In some examples associated with the second aspect, the one or more homogeneous features can include at least one of: a first set of recipient addresses in email samples of a first past spam campaign being substantially homogeneous with a second set of recipient addresses in email samples of a second past spam campaign; a TLD in sender addresses being substantially homogeneous across intra-campaign samples of a same past spam campaign; and a TLD in sender addresses being substantially homogeneous across inter-campaign samples of different past spam campaigns.

In some examples associated with the second aspect, wherein the one or more systematically heterogeneous features can include at least one of: domain names in sender addresses being systematically heterogeneous across intra-campaign samples and inter-campaign samples in containing non-dictionary words; domain names in sender addresses being systematically heterogeneous across intra-campaign samples and inter-campaign samples in mismatching email body content; and domain names in sender addresses being systematically heterogeneous across intra-campaign samples and inter-campaign samples in including heterogeneous subdomains.

In some examples associated with the second aspect, the operations can include: compiling the domain name records in accordance with one or more homogeneously origin-referencing features of substantially homogeneous email samples; and determining additional homogeneously origin-referencing features based on comparing the origin-referencing features against the compiled domain name records.

In some examples associated with the second aspect, the operations can include: writing domain matching expressions based on predicted future homogeneous spam origin descriptors and time-sensitive homogeneous features; and matching the predicted homogeneous spam origin descriptors and time-sensitive homogeneous features against the compiled domain name records comprises applying the domain matching expressions against the compiled domain name records.

In some examples associated with the second aspect, the operations can include generating a domain list based on the predicted spam origins; distributing the domain list to a proxy server; and configuring a mail scanner running on the proxy server to block emails according to the distributed domain list.

According to a third aspect, one or more computer-readable media storing computer-executable instructions that, when executed by one or more processing units, cause the one or more processing units to perform operations to block an email spam campaign. The operations can include comparing origin-referencing features of a set of substantially homogeneous email samples against compiled domain name records from a DNS records source to predict homogeneous spam origin descriptors; and matching the predicted homogeneous spam origin descriptors and time-sensitive homogeneous features against the compiled domain name records to identify predicted spam origins among matched domain name records.

In some examples associated with the third aspect, the operations can include: determining email samples of a past spam campaign; identifying one or more homogeneous features across a set of the email samples; identifying one or more systematically heterogeneous features across the set of the email samples; and identifying the set of email samples as substantially homogeneous.

In some examples associated with the third aspect, the one or more homogeneous features can include at least one of: a first set of recipient addresses in email samples of a first past spam campaign being substantially homogeneous with a second set of recipient addresses in email samples of a second past spam campaign; a TLD in sender addresses being substantially homogeneous across intra-campaign samples of a same past spam campaign; and a TLD in sender addresses being substantially homogeneous across inter-campaign samples of different past spam campaigns.

In some examples associated with the third aspect, the one or more systematically heterogeneous features can include at least one of: domain names in sender addresses being systematically heterogeneous across intra-campaign samples and inter-campaign samples in containing non-dictionary words; domain names in sender addresses being systematically heterogeneous across intra-campaign samples and inter-campaign samples in mismatching email body content; and domain names in sender addresses being systematically heterogeneous across intra-campaign samples and inter-campaign samples in including heterogeneous subdomains.

In some examples associated with the third aspect, the operations can include: compiling the domain name records in accordance with one or more homogeneously origin-referencing features of substantially homogeneous email samples; and determining additional homogeneously origin-referencing features based on comparing the origin-referencing features against the compiled domain name records.

In some examples associated with the third aspect, the operations can include: writing domain matching expressions based on predicted future homogeneous spam origin descriptors and time-sensitive homogeneous features; and matching the predicted homogeneous spam origin descriptors and time-sensitive homogeneous features against the compiled domain name records comprises applying the domain matching expressions against the compiled domain name records.

In some examples associated with the third aspect, the operations can include: generating a domain list based on the predicted spam origins; distributing the domain list to a proxy server; and configuring a mail scanner running on the proxy server to block emails according to the distributed domain list.

This Summary is provided to introduce a selection of concepts in a simplified form that are further described below in the Detailed Description. This Summary is not intended to identify key and/or essential features of the claimed subject matter, nor is it intended to be used as an aid in determining the scope of the claimed subject matter. The term "techniques," for instance, can refer to system(s), method(s), computer-readable instructions, module(s), component(s), algorithms, hardware logic, and/or operation(s) as permitted by the context described above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar and/or identical items.

FIGS. 5A, 5B, and 5C are flow diagrams that illustrate example processes associated with applying publicly available intelligence to spam forecasting in some instances described herein.

Figure 1:
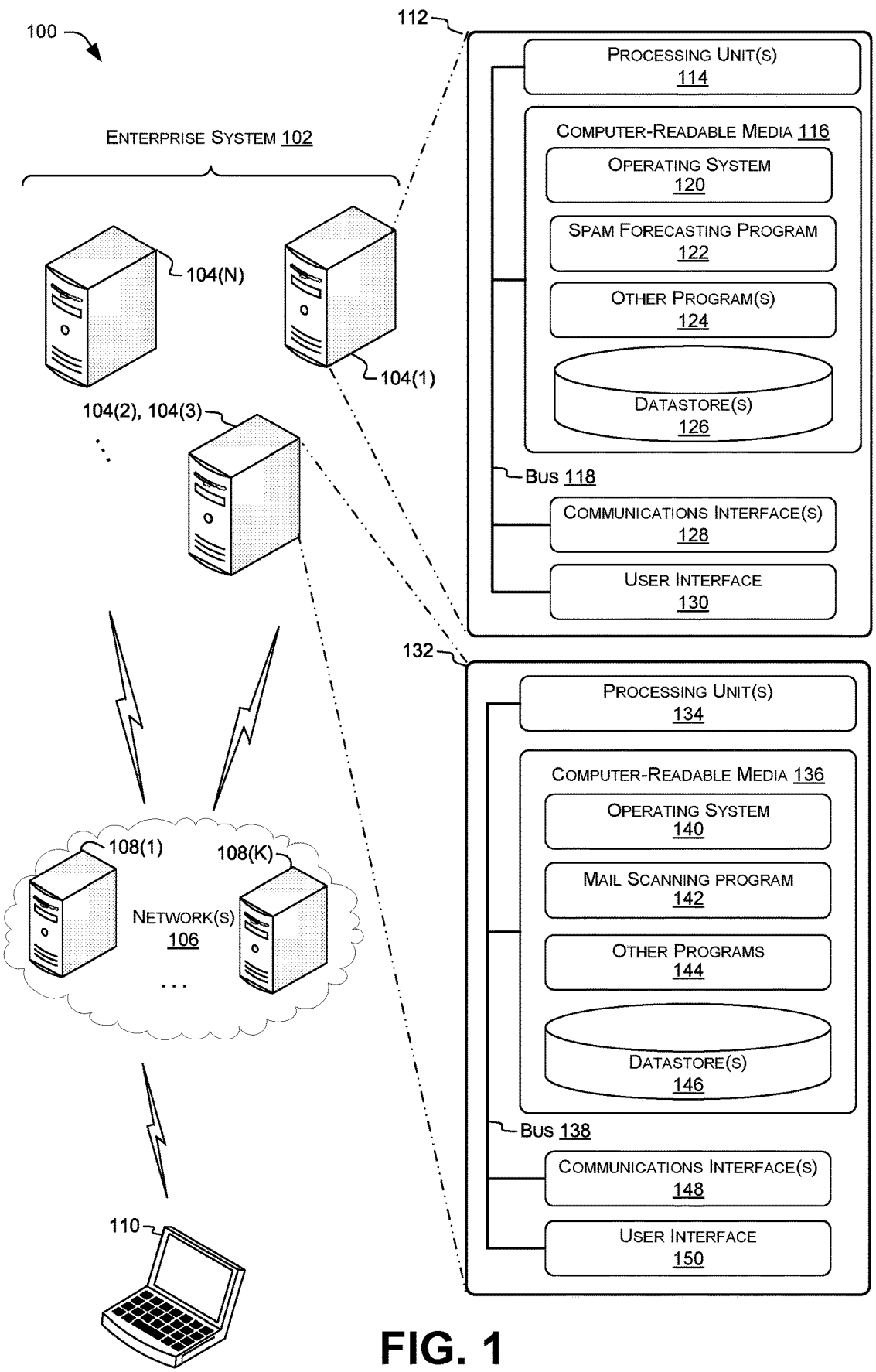
FIG. 1 is a block diagram depicting an example environment for applying publicly available intelligence to spam forecasting as described herein.
Figure 2:
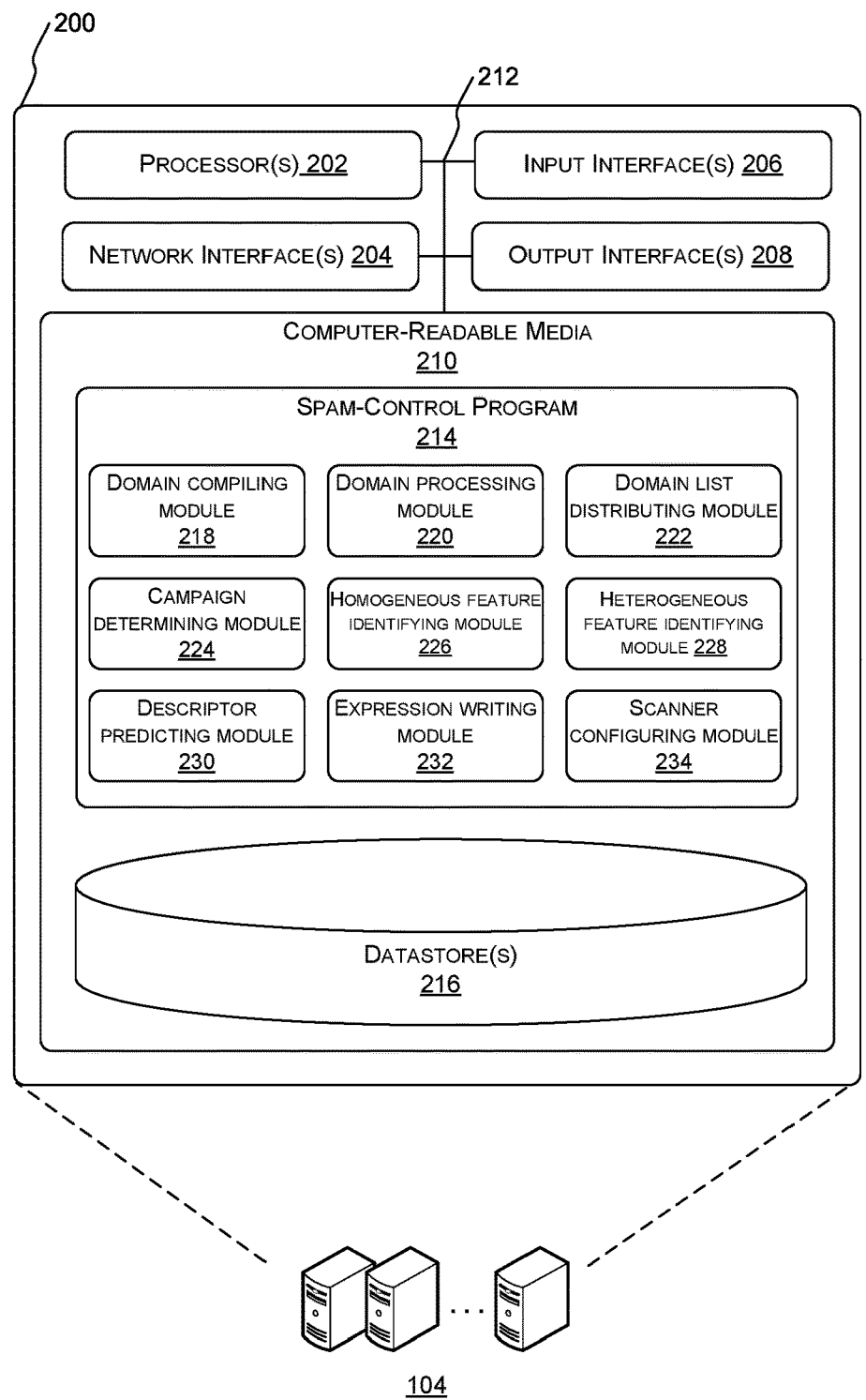
FIG. 2 is a block diagram depicting an example computing device for applying publicly available intelligence to spam forecasting as described herein.
Figure 3:
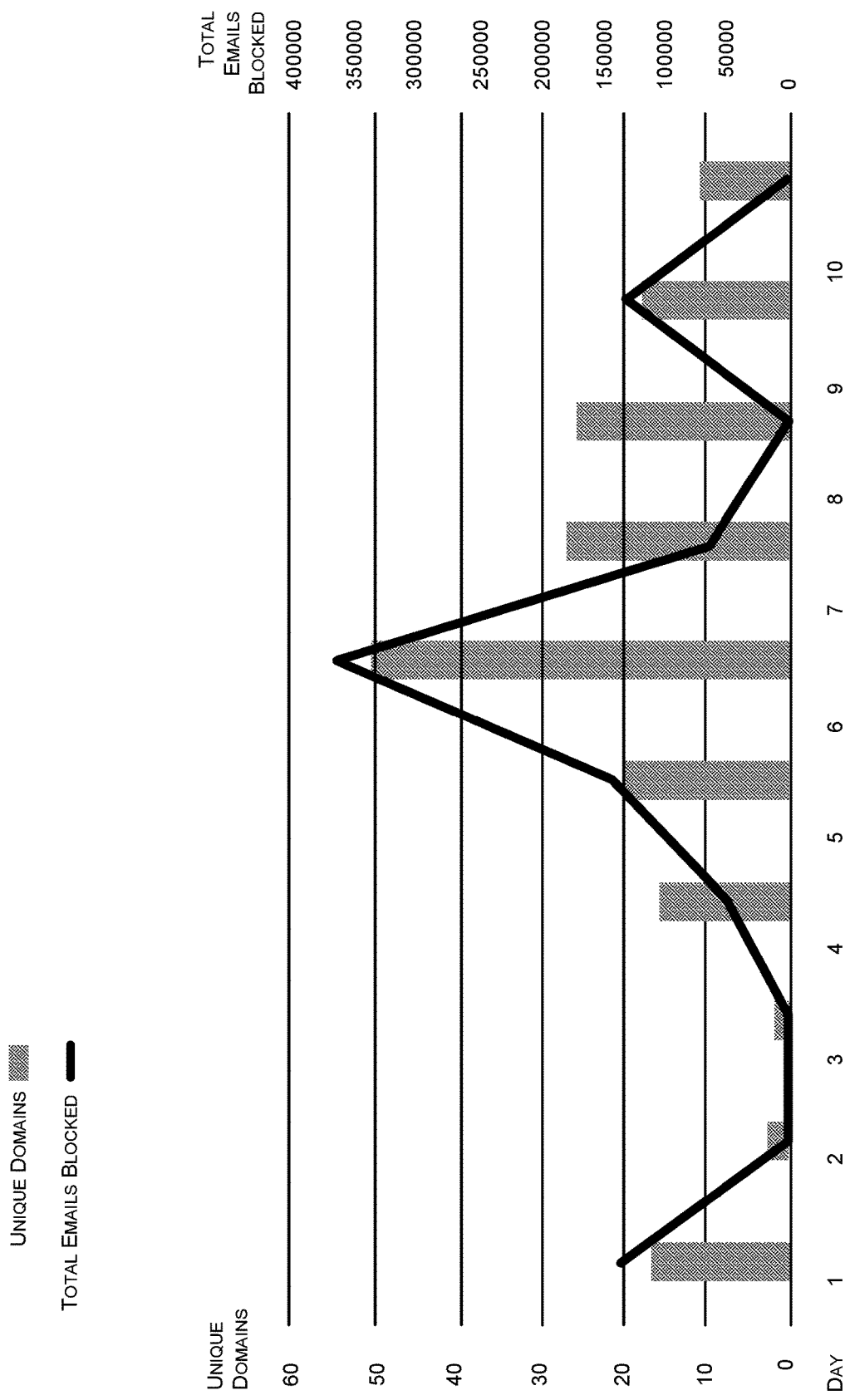
FIG. 3 is a diagram illustrating example results of applying publicly available intelligence to spam forecasting as described herein.

The components shown in FIGS. 1 and 2 can be implemented in hardware, software, and/or a combination thereof. In the context of software, the modules or components represent computer-executable instructions that, when executed by one or more processing unit(s), cause one or more processing unit(s) to perform operations. In the context of hardware, the components represent circuitry to perform logic functions implemented, e.g., datapath-control, finite-state-machine sequencing functions, etc. In addition, the diagram of results shown in FIG. 3 is only one example illustrating results of applying publicly available intelligence to spam forecasting as described herein, and the described system can produce additional and/or other results. Moreover, the order in which the operations are described in the example flow diagrams shown in FIGS. 4, 5A, 5B, and 5C and/or other processes described herein is not intended to be construed as a limitation, and any number of the described operations can be combined in any order and/or in parallel to implement each process.

DETAILED DESCRIPTION

Overview

According to example embodiments of the present disclosure, by operation of a spam forecasting system to perform the blocks of the example processes herein, the spam forecasting system can identify email samples of past spam campaigns; and can identify substantially homogeneous email samples from among these based on homogeneous and systematically heterogeneous features. Furthermore, on a periodic basis as frequently as daily, the spam forecasting system can compile domain name records from a DNS records source in accordance with one or more homogeneously origin-referencing features of substantially homogeneous email samples; can compare origin-referencing features of substantially homogeneous email samples against domain name records to determine additional homogeneously origin-referencing features and predict future homogeneous spam origin descriptors; can write domain matching expressions based on predicted future homogeneous spam origin descriptors and time-sensitive homogeneous features; can apply domain matching expressions to the compiled domain name records to identify predicted spam origins among matched domain name records; can forecast a future spam campaign to originate from the predicted spam origins; and can configure a mail proxy server to block future emails from the predicted spam origins.

According to example embodiments of the present disclosure, since spam campaigns of the nature of spam floods cause mail servers of enterprise systems to incur substantial unproductive network traffic, mail handling workloads, and congestion of inbound and outbound mail, it is desired to implement forecasting of spam campaigns to entirely avoid receiving and processing spam floods at mail servers. In order to outmaneuver the engineering of email messages, sending addresses, sending domains, and the like by spam originators to evade conventional spam blocking, example embodiments of the present disclosure configure a system to analyze large volumes of sample emails from past spam campaigns to identify homogeneous features, as well as systematically heterogeneous features, which spam originators fail to obfuscate. By extracting origin-referencing features therefrom, the system can predict that spam originators will mass-acquire domain names at certain registrars for the purpose of future spam floods, and repeatedly and periodically analyze domain name records on an automated basis to identify domain names which will imminently be utilized as spam origins. Since it can be necessary to block tens of thousands of domains preemptively to avert spam floods, and humans cannot actionably analyze massive volumes of domain records within the narrow window of time that spam origin domains are deployed, performance of such large-scale analysis by a computing system allows spam origins to be predicted on a timely basis within a day of spam floods being deployed, and domain lists to be generated and configured responsively in time to prevent the spam floods.

Illustrative Environment

FIG. 1 shows an example environment 100 in which examples of a spam forecasting system can operate and/or in which methods associated with a spam forecasting system such as those described herein can be performed. The illustrated environment includes an enterprise system 102. Enterprise system 102 includes computing device(s) 104(1)-104(N) (individually and/or collectively referred to herein with reference 104), where N is any integer greater than and/or equal to 1. Computing device(s) 104 can include, for example, server(s) and/or desktop computer(s), laptop computer(s), tablet computer(s), hybrid computing device(s), and/or smart phone(s), etc. Computing device(s) 104 can include a diverse variety of device categories, classes, and/or types and are not limited to any of the particular types of devices illustrated.

In the illustrated example, computing device(s) 104(1)-104(N) can be computing nodes of an enterprise system 102, e.g., distributed computing resources such as in a computing cluster, which can be hosted by a cloud service such as MICROSOFT AZURE, VMWARE VCLOUD, RACKSPACE, Inc.'s OPENSTACK, AMAZON WEB SERVICES (AWS), IBM SMARTCLOUD, ORACLE CLOUD, etc. Computing devices 104(1)-104(N) in enterprise system 102 can share resources, balance load, increase performance, and/or provide fail-over support and/or redundancy, etc.

By way of example and not limitation, computing device(s) 104 can include, but are not limited to, blade server(s) and/or other types of server computing device(s) (e.g., 104(1)) providing a variety of functionality such as gateway server(s) (e.g., 104(2)), proxy server(s) (e.g., 104(3)), email server(s), Web servers, map/reduce servers and/or other computation engines, and/or network-attachedstorage units. By way of example and not limitation, computing device(s) 104 can also include, but are not limited to, desktop computers, laptop computers tablet computers, tablet hybrid computers, and/or other telecommunication devices, desktop computers, and/or integrated components for inclusion in computing devices, appliances, and/or other computing device(s) configured to participate in and/or carry out a method associated with a spam forecasting system as described herein.

In some examples, as indicated, computing device(s), e.g., computing devices 104, can intercommunicate to participate in and/or carry out methods associated with a spam forecasting system as described herein. For example, a computing device 104 can be a query source and/or data source and another computing device 104 can host modules and/or components of a spam forecasting system to store data, to be queried, and/or to provide workflow to manage and/or implement spam forecasting as further described below with reference to, e.g., FIGS. 2-5C.

Different devices and/or types of computing devices 104 can have different needs and/or ways of interacting with enterprise system 102. For example, computing devices 104 can interact with enterprise system 102 with discrete request/response communications, e.g., for responses and/or updates to manage workflow related to spam forecasting. Additionally, and/or alternatively, computing devices 104 can be query sources and/or data sources and can interact with enterprise system 102 with discrete and/or ongoing transmissions of data related to spam forecasting.

In some examples, computing devices 104 can communicate with each other and/or with other computing devices via one or more network(s) 106. In some examples, computing devices 104 can communicate with external devices such as domain name system (DNS) server(s) 108 via network(s) 106. For example, network(s) 106 can include public networks such as the Internet, private networks such as an institutional and/or personal intranet, and/or combination(s) of private and public networks. Private networks can include networks connected to the Internet and/or other public network(s) via network address translation (NAT) devices, firewalls, network intrusion detection systems, and/or other devices that restrict and/or control the types of network packets permitted to flow between the private network and the public network(s).

Network(s) 106 can also include any type of wired and/or wireless network, including but not limited to local area networks (LANs), wide area networks (WANs), satellite networks, cable networks, Wi-Fi networks, WiMAX networks, mobile communications networks (e.g., 3G, 4G, 5G, and so forth), any combination thereof, etc. Network(s) 106 can utilize communications protocols, such as, for example, packet-based and/or datagram-based protocols such as Internet Protocol (IP), Transmission Control Protocol (TCP), User Datagram Protocol (UDP), other types of protocols, and/or combinations thereof. Moreover, network(s) 106 can also include a number of devices that facilitate network communications and/or form a hardware infrastructure for the networks, such as switches, routers, gateways, access points, firewalls, base stations, repeaters, backbone devices, and the like. Network(s) 106 can also include a variety of devices that can facilitate communications between computing devices 104 and/or other devices using bus protocols of various topologies, e.g., crossbar switches, INFINIBAND switches, FIBRE CHANNEL switches and/or hubs, etc.

In some examples, network(s) 106 can further include devices that enable connection to a wireless network, such as a wireless access point (WAP). Examples support connectivity through WAPs that send and receive data over various electromagnetic frequencies (e.g., radio frequencies), including WAPs that support Institute of Electrical and Electronics Engineers (IEEE) 802.11 standards (e.g., 802.11g, 802.11n, and so forth), and/or one or more other standards, e.g., BLUETOOTH, cellular-telephony standards such as code division multiple access (CDMA), global system for mobile communication (GSM), 3rd Generation Partnership Project (3GPP) standards, such as long-term evolution (LTE) and/or new radio (NR), voice over internet protocols (VOIP), worldwide interoperability for microwave access (WiMAX), etc.

Different networks have different characteristics, e.g., bandwidth, latency, accessibility (open, announced but secured, and/or not announced), and/or coverage area. The type of network 106 used for any given connection between, e.g., a computing device 104 and other resources of enterprise system 102 and/or other devices such as DNS server(s) 108 can be selected based on these characteristics and on the type of interaction.

DNS server(s) 108 use DNS records to translate web site addresses from names that entered for web page addresses, aka uniform resource locators (URLs), to numeric internet protocol (IP) addresses, in the form ###.###.##.##, which are used to access a computer hosting the website associated with the URL. IP addresses are unique within a network, which for websites includes the entire internet. There are multiple types of DNS records that can be implemented. A base type of DNS record is a resource record (RR) that defines a particular resource including the host name for the record, the time to live (TTL) in seconds, which is the amount of time for the record to be cached, the class, which defines the protocol to be used (typically IN for internet protocol), the type, which identifies the RR type according to the type of data in the following data field, and the data payload for the particular type of record. RRs have the form name ttl class type data. In examples, types of DNS records can include canonical name (CNAME) records that cause a URL to automatically redirect from one domain to another. CNAME records have the form abc.yourdomain.com 86400 IN CNAME yourabc.anotherdomain.com. In various examples, types of DNS records can include email exchange (MX) records that point to the mail server that should deliver mail for a domain. MX records have the form 86400 IN MX 10 mail.domain.com. As another example, types of DNS records can include address (A) records that map a domain name to an IP address by automatically appending the domain to a name value. A records have the form www 86400 IN A ##.###.###.#. In various examples, types of DNS records can include name server (NS) records that indicate which server is responsible for queries for a domain. NS records have the form abc.yourdomain.com. 86400 IN NS ns1.abc.yourdomain.com, and typically there are at least two in case one of the name servers becomes unavailable, e.g., abc.yourdomain.com. 86400 IN NS ns2.abc.yourdomain.com. As another example, types of DNS records can include pointer (PTR) records that resolve an IP address to a domain name—essentially the reverse of an A record. PTR records have the form ##.###.###.#. in-addr.arpa PTR abc.yourdomain.com. In various examples, types of DNS records can include one or more of the above-noted types and/or other types of records.

One or more DNS server(s) 108 are often assigned as default DNS server(s) 108 by an internet service provider (ISP), and there are many available and publicly accessible alternative DNS server(s). There are a number of DNS server(s) 108(1)-108(K) (individually and/or collectively referred to herein with reference 108), where K is any integer greater than and/or equal to 1. In some examples, N=K; in other examples, N>K or N<K.

Spammers use spam-originating computing device(s) 110 to initiate and/or evolve email-spam campaigns. Spam-originating computing device(s) 110 can include, for example, desktop computer(s), laptop computer(s), tablet computer(s), hybrid computing device(s), and/or smart phone(s), etc. Spam-originating computing device(s) 110 can include a diverse variety of device categories, classes, and/or types and are not limited to the particular type of device illustrated and can connect to a variety of DNS server(s) 108 via network(s) 106. It should be understood that, despite spam-originating computing device(s) 110 being illustrated herein, such device(s) are generally unknown devices whose geographic locations, IP addresses, and the like cannot be identified. Therefore, spam forecasting systems according to example embodiments of the present disclosure can perform all functionality as described herein without ever identifying spam-originating computing device(s) 110.

Still referring to the example of FIG. 1, details of an example server computer 104(1) are illustrated at inset 112. The details of example server computer 104(1) can be representative of others of computing device(s) 104. However, each of the computing device(s) 104 can include additional or alternative hardware components and/or software modules.

Illustrated server computing device(s) 104(1) can include one or more processing unit(s) 114, e.g., integrated electronic circuit(s) operably connected to one or more computer-readable media 116, e.g., memories, such as via a bus 118. In some examples, a plurality of processing unit(s) 114 can exchange data through an internal interface bus (e.g., PCIe), rather than and/or in addition to network 106. While the processing unit(s) 114 are described as residing on the server computer(s) 104(1), in this example, the processing unit(s) 114 can also reside on different computing device(s) 104 in some examples. In some examples, at least two of the processing unit(s) 114 can reside on different computing device(s) 104. In such examples, multiple processing unit(s) 114 on the same computing device 104 can use a bus 118 of the computing device 104 to exchange data, while processing unit(s) 114 on different computing device(s) 104 can exchange data via network(s) 106.

Processing unit(s) 114 can include one or more microprocessors, single-core processors, multi-core processors, CPUs, GPUs, GPGPUs, and/or hardware logic components configured, e.g., via specialized programming from modules and/or APIs, to perform functions described herein. For example, and without limitation, illustrative types of hardware logic components that can be used in and/or as processing unit(s) 114 include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), Digital Signal Processors (DSPs), and other types of customizable processors. For example, a processing unit 114 can represent a hybrid device, such as a device from ALTERA and/or XILINX that includes a CPU core embedded in an FPGA fabric. These and/or other hardware logic components can operate independently and/or, in some instances, can be driven by a CPU. In some examples, at least some of computing device(s) 104 can include a plurality of processing unit(s) 114 of multiple types. For example, the processing unit(s) 114 shown in server computing device(s) 104(1) can be a combination of one or more CPUs, GPGPUs, FPGAs, etc. Different processing unit(s) 114 can have different execution models, e.g., as is the case for graphics processing units (GPUs) and central processing unit (CPUs).

Computer-readable media described herein, e.g., computer-readable media 116, includes digital storage media also termed non-transitory computer-readable media, and/or communication media. Digital storage media includes tangible storage units such as volatile memory, nonvolatile memory, and/or other persistent and/or auxiliary computer storage media, removable and non-removable digital storage media implemented in any method and/or technology for storage of information such as computer-readable instructions, data structures, program modules, and/or other data. Digital storage media includes tangible and/or physical forms of media included in a device and/or hardware component that is part of a device and/or external to a device, including but not limited to RAM, static RAM (SRAM), dynamic RAM (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards and/or other optical storage media, magnetic cassettes, magnetic tape, magnetic disk storage, magnetic cards and/or other magnetic storage devices and/or media, solid-state memory devices, storage arrays, network attached storage, storage area networks, hosted computer storage and/or memories, storage, devices, and/or storage media that can be used to store and maintain information for access by server computing device(s) 104(1).

In contrast to digital storage media also termed non-transitory computer-readable media, communication media can embody computer-readable instructions, data structures, program modules, and/or other data in a modulated data signal, such as a carrier wave, and/or other transitory transmission mechanism. As defined herein, digital storage media does not include communication media.

In some examples, computer-readable media 116 can store instructions executable by the processing unit(s) 114 that, as discussed above, can represent a processing unit incorporated in a computing device 104. Computer-readable media 116 can additionally and/or alternatively store instructions executable by external processing units such as by an external central processing unit (CPU) and/or external processor of any type discussed herein. In some examples at least one processing unit 114, e.g., a CPU, graphics processing unit (GPU), and/or hardware logic device, can be incorporated in server computing device(s) 104(1), while in some examples at least one processing unit 114, e.g., one or more of a CPU, GPU, and/or hardware logic device, can be external to server computing device(s) 104(1).

Computer-readable media 116 can store, for example, computer-executable instructions of programs, and/or applications that are loadable and executable by processing unit(s) 114 such as an operating system 120 and/or spam forecasting program 122, and/or other programs 124.

Computer-readable media 116 can also store, for example, one or more datastore(s) 126. Datastore(s) 126 can include multiple disparate databases or data sources. For example, the spam forecasting program 122 can store and/or access domain matching expressions derived from identified past spam campaigns in one or more datastore(s) 126. In at least one example, spam forecasting program 122 can perform data analysis and/or processing of data from the digital records obtained and/or received from the multiple disparate data sources to perform operations to forecast a future email spam campaign, and thereby prevent an email spam campaign preemptively.

Bus 118, which in some instances can include one or more of a system bus, a data bus, an address bus, a Peripheral Component Interconnect (PCI) Express (PCIe) bus, a PCI bus, a Mini-PCI bus, and any variety of local, peripheral, and/or independent buses, and/or any combination thereof can operably connect one or more processing unit(s) 114 to one or more computer-readable media 116.

Computing device(s) 104, including server computing device(s) 104(1), can also include one or more communications interfaces 128 connected via the bus 118 to processing unit(s) 114 to enable wired and/or wireless communications between server computing device(s) 104(1) and other networked computing devices 104 involved in methods associated with a spam forecasting program 122, and/or other computing device(s), e.g., over network(s) 106. Such communications interface(s) 128 can include one or more transceiver devices, e.g., network interface controllers (NICs) such as Ethernet NICs and/or other types of transceiver devices, to send and receive communications over a network. The processing unit(s) 114 can exchange data through respective communications interface(s) 128. In some examples, the communications interface 128 can include a PCI Express (PCIe) transceiver, and the network 106 can include a PCIe bus. In some examples, the communications interface 128 can include, but is not limited to, a transceiver for cellular (3G, 4G, 5G, and/or other), WI-FI, Ultra-wideband (UWB), BLUETOOTH, and/or satellite transmissions. The communications interface 128 can include a wired I/O interface, such as an Ethernet interface, a serial interface, a Universal Serial Bus (USB) interface, an INFINIBAND interface, and/or other wired interfaces. The communications interface 128 can additionally and/or alternatively include one or more user-interface devices, buses such as memory buses and/or local buses, memory interfaces, and/or hardwired interfaces such as 0-20 mA control lines. For simplicity, these and other modules or components are omitted from the illustrated server computing device 104(1).

In some examples not shown, one or more of the processing unit(s) 114 in one of the server computing device(s) 104(1) can be operably connected to computer-readable media 116 in a different one of the computing device(s) 104, e.g., via communications interface 128 and network 106. For example, program code to perform steps of flow diagrams herein, e.g., as described herein with reference to methods associated with the spam forecasting program 122, can be downloaded from a first computing device 104 operating as a server to a second computing device 104 operating as a client for purposes of certain aspects of the spam forecasting system, via the network 106, and executed by one or more processing unit(s) in second computing device 104. For example, the computer-executable instructions stored on the computer-readable media 116 can upon execution configure a computer such as a computing device 104(1) to perform operations described herein with reference to the operating system 120 and/or spam forecasting program 122 and send lists or criteria to block spam to be implemented by a proxy server and/or email server.

As noted above, computer-readable media 116 of the server computing device 104(1) can store an operating system 120 and/or spam forecasting program 122. In some examples, an operating system 120 is not used (commonly referred to as a "bare metal" configuration). In some examples, the operating system 120 and/or spam forecasting program 122 can include modules or components that enable and/or direct the server computing device 104(1) to receive data via various input interfaces (e.g., user controls, network and/or communications interfaces, memory devices, and/or sensors), and process the data using the processing unit(s) 114 to generate output. The operating system 120 and/or spam forecasting program 122 can further include one or more modules or components that present the output (e.g., display an image on an electronic screen, store data in memory, and/or transmit data to another computing device). The operating system 120 and/or spam forecasting program 122 can enable a developer or an engineer, to interact with a computing device 104 using a user interface 130. User interface(s) (UI)s 130 described herein can include one or more of a graphical user interface (GUI), and audio user interface (AUI), and/or various other input/output interfaces generally referenced as UI including touch-input interfaces and the like. Additionally, the operating system 120 and/or spam forecasting program 122 can include modules or components that perform various functions generally associated with an operating system, e.g., storage management and internal-device management.

In some examples, server computing device(s) 104(1) can include a user interface 130 configured to permit a developer or an engineer responsible for server computing device 104(1), enterprise system 102, environment 100 and/or an application administrator, to operate the spam forecasting program 122 and/or to access the datastore(s) 126.

Details of an example gateway server(s) 104(2) and proxy server(s) 104(3) are illustrated at inset 132. The details of example gateway server(s) 104(2) and proxy server(s) 104(3) can be representative of others of computing device(s) 104. However, each of the computing device(s) 104 can include additional and/or alternative hardware and/or software components. gateway server(s) 104(2) and proxy server(s) 104(3) can include one or more processing unit(s) 134 operably connected to one or more computer-readable media 136, e.g., via a bus 138. Some examples of processing unit(s) 134 are discussed above with reference to processing unit(s) 114. Some examples of computer-readable media 136 are discussed above with reference to computer-readable media 116. For example, computer-readable media 136 can include one or more digital storage media or communications media. Some examples of bus 138 are discussed above with reference to bus 118.

Computer-readable media 136 can store, for example, computer-executable instructions of an operating system 140, a mail scanning program 142, and/or other modules, programs, and/or applications 144 that are loadable and executable by processing unit(s) 134 as well as one or more datastore(s) 146. Other programs 144 can be operable with a mail scanning program 142. Some examples of operating system 140 are discussed above with reference to operating system 120. Some examples of datastore 146 are discussed above with reference to datastore 126.

In some examples, the gateway server(s) 104(2) and proxy servers(s) 104(3) can be configured to communicate with enterprise system 102, other computing device(s) 104, DNS server(s) 108, etc. via a communications interface 148. A mail scanning program 142, on proxy servers(s) 104(3) can enable implementation of predicted blocking of spam origins. For example, mail scanning program 142 can send a query to and/or send or receive information from datastore 126, can store the information received in datastore 146, and can perform techniques associated with a spam forecasting system as described herein.

Gateway server(s) 104(2) and proxy server(s) 104(3) can include one or more communications interfaces 148 connected via the bus 138 to processing unit(s) 134 to enable wired and/or wireless communications between computing device(s) 104, enterprise system 102, and/or other computing device(s), over network(s) 1026. Some examples are discussed above with reference to communications interface(s) 128.

Gateway server(s) 104(2) and proxy server(s) 104(3) can include a user interface 150. For example, computing device 104(2) can provide user interface 150 to control and/or otherwise interact with mail scanning program 142 and/or other programs 144, other computing devices 104 and/or other parts of enterprise system 102, and/or other computing devices. For example, processing unit(s) 134 can receive inputs e.g., typed and/or spoken queries, selections, and/or other input actions associated with spam forecasting via user interface 150 and transmit corresponding data via communications interface(s) 148 to server computing device(s) 104(1) and/or other computing devices 104.

User interfaces 130 and/or 150 can include one or more input devices, integral and/or peripheral to server computing device 104(1) and/or gateway server 104(2) and/or proxy server 104(3). The input devices can be user-operable, and/or can be configured for input from other server computing device 104(1) and/or gateway server 104(2) and/or proxy server 104(3). Examples of input devices can include, e.g., a keyboard, keypad, a mouse, a trackball, a pen sensor and/or smart pen, a light pen and/or light gun, a joystick controller, a voice input device such as a microphone, voice-recognition device, and/or speech-recognition device, a touch input device such as a touchscreen and/or a touch pad, a gestural and/or motion input device such as a depth camera, a grip sensor, an accelerometer, another haptic input, a visual input device such as one or more cameras and/or image sensors, a QR code or bar code scanner, and the like. User interfaces 130 and/or 150 can include one or more output devices configured for communication to a user and/or to another computing device 104. Output devices can be integral and/or peripheral to server computing device 104(1) and/or gateway server 104(2) and/or proxy server 104(3). Examples of output devices can include a display, a printer, audio speakers, beepers, and/or other audio output devices, a vibration motor, linear vibrator, and/or other haptic output device, and the like.

In some examples, functions described herein can be shared between one or more computing device(s) 104. For example, one or more of the computing device(s) 104 can operate an input layer of one or more neural network(s) and the enterprise system 102 and/or one or more of computing device(s) 104 can operate one or more hidden layers and/or output layers of one or more neural network(s). In some examples, the server computing device(s) 104(1) can derive homogeneous features and systematically heterogeneous features from sample spam emails associated with an identified past spam campaign; determine homogeneous domain features from sample spam emails; write matching expressions based on a time-sensitive domain feature, and the enterprise system 102 and/or server computing device(s) 104(1) can compile domain name records from DNS records sources, and search domain name records matching expressions by an expression matching module of spam forecasting program 122. In some examples, the server computing device(s) 104(1) can store the compiled domain name records in datastore 126, generate a predicted domain list from the compiled domain name records, and distribute the predicted domain list to proxy server(s) 104(3), etc. Proxy server(s) 104(3) can implement mail scanning program 142 incorporating the received domain list in order to block spam campaigns preemptively, thereby utilizing the domain list as a blacklist.

According to example embodiments of the present disclosure, it should be understood that a "past spam campaign" can refer to an inferred past event, characterized by mail servers of the enterprise system 102 receiving a high volume of emails within a short span of time; for example, mail servers can receive hundreds of emails within one minute. Additionally, a "past spam campaign" can be characterized by such high-volume emails being addressed to a recurring set of recipient addresses, a recurring set of recipient addresses being shared across multiple past spam campaign incidences. It should be understood that the occurrence and timespan of past spam campaigns are generally defined by collecting samples of unsolicited emails received at a mail server of the enterprise system 102; by reviewing samples of high volumes of unsolicited emails received within short spans of time, the enterprise system 102 and/or server computing device(s) 104(1) can infer that a spam campaign targeting the enterprise system 102 was carried out during that time from unknown spam-originating computing device(s) 110.

Samples of unsolicited emails characterizing a past spam campaign can include origin-referencing features. For example, email headers can include a sending domain, which can be a top-level domain ("TLD") name extractable from a "From:" field of the email header. While the "From:" field of email headers ostensibly identify an address of the email sender, spam emails tend to be sent from disposable sender addresses which are readily discarded. However, even though the sender address can fail to indicate origin of the email, a TLD name extracted from the sender address can be used in a query according to the WHOIS protocol to cause a WHOIS service to return domain name registration records. Thus, the TLD name is an origin-referencing feature in that it can be used to retrieve domain name registration records which contain origin-indicating features, as shall be described subsequently.

Domain name registration records retrieved by a WHOIS protocol query can include several origin-indicating features which, by indicating the origin of the registration of the queried TLD name, indirectly indicate the origin of spam emails sent from a sender address containing the queried TLD name. These origin-indicating features can include IP addresses of a domain name, identifying information of a domain name registrant, and so on. However, spam originators generally obfuscate such origin-indicating features so that they cannot directly identify the spam originator.

Samples of unsolicited emails characterizing a past spam campaign can include heterogeneous features and homogeneous features; heterogeneous features can further include systematically heterogeneous features. In order to evade conventional spam blocking, such as reputation-based blocking and content-based blocking, spam emails are commonly made to be heterogeneous in a number of regards, to yield some number of spam emails which, being non-uniform in origin and non-uniform in content, evade known reputation-based blocking rules and content-based blocking rules. At the same time, since emails of the same spam campaign are generally sent from a same spam-originating computing device 110 by a same spam originator party, emails of the same spam campaign ultimately include certain features which are unavoidably homogeneous. Moreover, homogeneous features of samples can be homogeneous across samples of a same campaign (subsequently referenced as "intra-campaign samples"), can be homogeneous across samples of multiple campaigns (subsequently referenced as "inter-campaign samples"), or both. Additionally, by engineering features of emails to be heterogeneous in a systematic fashion, spam originators can create systematically heterogeneous features, rather than randomly heterogeneous features. Both homogeneous features and systematically heterogeneous features can indicate that sample emails were engineered to evade conventional spam blocking.

Generally, spam originators seek to include heterogeneous features in spam emails to evade conventional blocking rules. However, at the same time, some features of these spam emails remain unavoidably homogeneous, and some engineered heterogeneous features are systematically heterogeneous, reflecting the artificiality of the engineering effort. As a result of spam originator efforts, such remaining homogeneous features generally cannot be detected by conventional blocking rules, nor can systematically heterogeneous features; however, some of these features can be used according to example embodiments of the present disclosure to determine that sample emails are substantially homogeneous (in that they derive from a same past spam campaign).

Additionally, other such features can be origin-referencing features (not necessarily origin-indicating features) and can be used according to example embodiments of the present disclosure to predict a homogeneous spam origin descriptor. Based on periodically compiling domain name records from DNS records sources, predicted homogeneous spam origin descriptors and a time-sensitive homogeneous feature can be compared against the compiled domain name records to forecast future spam campaigns.

For example, a first set of recipient addresses in email samples of a first past spam campaign can be substantially homogeneous with a second set of recipient addresses in email samples of a second past spam campaign; thus, sets of recipient addresses can be substantially homogeneous across inter-campaign samples. Both valid and invalid recipient addresses can be substantially homogeneous across inter-campaign samples, and it can be statistically less probable for invalid recipient addresses in each set of recipient addresses to be substantially homogeneous. Multiple spam campaigns originating from a same origination are likely to target a same, reused list of recipient addresses, and so such a homogeneous feature can indicate homogeneity among email samples. However, such a homogeneous feature can be insufficient to predict spam origins in the future, since it is desired to predict spam origins before they send out spam emails.

Additionally, in spam emails, a common strategy for evading conventional blocking rules is to utilize non-homogeneous sender addresses not previously used in any other spam campaign, since any previously used sender address can already have been flagged as a spam-originating address and included in conventional blocking rules. In particular, these sender addresses can include non-homogeneous domain names, since any domain name included in numerous spam-originating sender address can be flagged as a spam-originating domain, causing all sender addresses including this domain to be collectively blocked in a conventional blocking rule. As a result, spam originators frequently mass-acquire domain names for the use of generating non-homogeneous sender addresses in future spam campaigns.

However, regardless of how many domain names are mass-acquired by spam originators, some number of homogeneous features remain among the sender addresses generated from the mass-acquired domain names, though these homogeneous features can still evade conventional blocking rules. For example, a TLD in sender addresses can be substantially homogeneous across intra-campaign samples of a same past spam campaign, and also substantially homogeneous across inter-campaign samples of different past spam campaigns. A TLD appearing substantially homogeneously in sender addresses can be a common TLD encompassing large numbers of low-priced domain names, such as the .com TLD. By purchasing domain names having a common TLD over domain names having less common TLDs, spam originators can acquire more domain names at lower expense, and so such a homogeneous feature can indicate homogeneity among email samples. Additionally, such a homogeneously origin-referencing feature can indicate that domain names mass-acquired having this common TLD can be predicted to be spam origins in the future, though this alone can be insufficient to predict future spam origins.

Additionally, domain names in sender addresses can be systematically heterogeneous across intra-campaign samples and inter-campaign samples in containing non-dictionary words. Domain names made up of widely recognized words such as dictionary words are generally priced higher than domain names not made up of dictionary words, such as domain names made up of misspelled words. By purchasing many heterogeneous domain names which are systematically made up of non-dictionary words, spam originators can acquire more domain names at lower expense, and so such a systematically heterogeneous feature can indicate homogeneity among email samples. However, due to the heterogeneity of such a feature, it can be insufficient to predict future spam origins.

Additionally, domain names in sender addresses can be systematically heterogeneous across intra-campaign samples and inter-campaign samples in mismatching email body content. For example, a word in a domain name in a sender address can be suggestive of subject matter which is not mentioned in an email body, and/or keywords in the email body can refer to subject matter which is not suggested by a domain name in a sender address. Conventionally, spam emails are known to advertise goods and/or services using a domain name suggestive of the goods and/or services or related to the goods and/or services, so by making heterogeneous domain names systematically mismatch the advertised goods and/or services, spam originators can create spam emails which evade conventional spam blocking rules, and so such a systematically heterogeneous feature can indicate homogeneity among email samples. However, due to the heterogeneity of such a feature, it can be insufficient to predict future spam origins.

Additionally, domain names in sender addresses can be systematically heterogeneous across intra-campaign samples and inter-campaign samples in their inclusion of heterogeneous subdomains. Although domain names including subdomain names can ultimately be resolved to an originating IP address by referencing the domain name against a CNAME record and a MX record in a DNS system (in manners as known to persons skilled in the art), such lookups can ultimately fail to resolve the domain name to a true originating IP address for the spam emails. However, even so, it can be observed that the domain names collectively include systematically heterogeneous subdomain names (i.e., subdomain names being unrelated to the domain names and being unrelated to each other). By attaching heterogeneous subdomain names to domain names, spam originators seek to generate widely heterogeneous domain names to evade conventional blocking rules; however, the heterogeneous and random nature of the subdomain names across intra-campaign samples and inter-campaign samples is, in turn, systematic, and so such a systematically heterogeneous feature can indicate homogeneity among email samples. However, due to the heterogeneity of such a feature, it can be insufficient to predict future spam origins.

Additionally, domain names in sender addresses can be registered at a common domain name registrar. By mass-acquiring domain names at a same registrar, particularly registrars offering lower costs, spam originators can save effort and save cost in acquiring a large, heterogeneous selection of domain names; since such heterogeneous domain names are intended to be used to generate disposable sender addresses, spam originators do not desire to invest substantially in acquiring these domain names. Spam originators are therefore likely to reuse these registrars for future spam campaigns. Thus, a common registrar across intra-campaign samples and inter-campaign samples is a homogeneous feature of the intra-campaign samples and of the inter-campaign samples, and so such a homogeneously origin-referencing feature can indicate that domain names mass-acquired at this common registrar can be predicted to be spam origins in the future.

Additionally, domain names in sender addresses can be parked at approximately the same time or substantially in close succession. By mass-acquiring domain names at the same time, spam originators can save effort in acquiring a large selection of domain names, which are meant to be used in a limited number of spam campaigns and then discarded. It should be understood that parking of a domain refers to registering the domain without yet directing the domain by DNS services to a network address controlled by the registrant (i.e., the spam originator). Parked domains generally point to default name servers provided by DNS registrars until the registrant re-configured the parked domains; in the case of spam originators, the parked domains are re-configured (updating A records, NS records, and MX records) before a spam campaign begins. Thus, domain names in sender addresses collectively being parked (i.e., being directed to one or more default name servers of a DNS registrar) at the same time (for the duration of possibly less than a day) is a homogeneous feature of intra-campaign samples and is a homogeneous feature of the intra-campaign samples.

Such a homogeneous feature is highly time-sensitive, as such parked domains can be deployed for a spam campaign within less than a day from being parked. Such a time-sensitive homogeneous feature can only be detected by periodically compiling domain name records from up-to-date DNS records sources. Such a time-sensitive homogeneous feature cannot be used to determine homogeneity across email samples, and cannot indicate a homogeneous spam origin; however, if such a time-sensitive homogeneous feature is found across many domains at a predicted spam origin, a future spam campaign originating from these domains can be forecast.

It should be understood that the homogeneous features and systematically heterogeneous features described above can be further characterized as self-contained features, registration-referenced features, and time-sensitive homogeneous features. Self-contained features can be identified by comparing email samples, without reference to other information: first, by comparing various features of email samples without regard as to their nature, one or more features can be determined as substantially homogeneous among a set of email samples; and one or more features can be determined as heterogeneous.

Among a set of email samples exhibiting at least one homogeneous feature, particularly a statistically less probable homogeneous feature (for example, a recurring set of recipient addresses compared to email samples of a past spam campaign), additional homogeneous features can be identified, including statistically more probable homogeneous features, to reinforce the homogeneity of the set of email samples (for example, TLDs in sender addresses being substantially homogeneous).

Additionally, among a set of email samples exhibiting at least one homogeneous feature, systematically heterogeneous features can be identified to also reinforce the homogeneity of the set of email samples (for example, domain names in sender addresses containing non-dictionary words; domain names in sender addresses mismatching email body content; domain names including heterogeneous subdomains).

After a set of email samples has been determined as including one or more homogeneous features and one or more systematically heterogeneous features, origin-referencing features of the set of email samples can be compared against domain name records to additionally determine homogeneously origin-referencing features of the set of email samples (for example, domain names in sender addresses being registered at a common domain name registrar). The homogeneously origin-referencing features can predict a future homogeneous spam origin descriptor (for example, any number of unspecified domains mass-acquired at the common domain name registrar).

After homogeneously origin-referencing features are determined, domain matching expressions can be written based on homogeneously origin-referencing features, based on predicted future homogeneous spam origin descriptors, and based on time-sensitive homogeneous features. A domain matching expression can be a regular expression ("regex") as known to persons skilled in the art, which, based on one of the above homogeneous features, matches similar features of domain name records compiled from a DNS records source. For the purpose of example embodiments of the present disclosure, domain name records can refer to any hosted records subject to public access, subject to some extent of controlled access (such as account registration at a DNS records source), or not publicly accessible, which include information of registered domains, including date of registration. DNS records sources can include, by way of example and without limitation, DNS hosting services, DNS registrars, and DNS registration aggregators. DNS hosting services can be providers of DNS servers enabling domain names to be reached over the public Internet through DNS queries; DNS registrars generally provide DNS hosting services as well. DNS hosting services generally host domain zone files, which list all domain names accessible through the DNS hosting service, such as, in the cast of a DNS hosting service operated by a registrar, all domain names registered by the registrar. Additionally, TLD registries, such as the .com registry maintained by VERISIGN INC. of Reston, VA, maintain TLD zone files which list all domain names having a same TLD, such as the .com TLD.

Domain name records can be periodically compiled based on a homogeneously origin-referencing feature (for example, .com TLD zone files, based on a homogeneously origin-referencing feature being the .com TLD). Domain matching expressions (based on homogeneously origin-referencing features, based on predicted future homogeneous spam origin descriptors, and based on time-sensitive homogeneous features) can be applied to compiled domain name records to identify some number of predicted spam origins which match both homogeneously origin-referencing features and time-sensitive homogeneous features (for example, the domains all include the .com TLD according to a homogeneously origin-referencing feature; the domains are all acquired at a common domain name registrar according to a homogeneously origin-referencing feature; and the domains are all parked according to a time-sensitive homogeneous feature). A future spam campaign can be forecast as originating from these predicted spam origins.

According to example embodiments of the present disclosure, based on email samples of past spam campaigns, a spam forecasting system can identify substantially homogeneous email samples based on homogeneous features and systematically heterogeneous features. According to example embodiments of the present disclosure, to forecast future spam campaigns, a spam forecasting system can, on a periodic basis, compile domain name records in accordance with one or more homogeneously origin-referencing features of substantially homogeneous email samples; match domain matching expressions representing homogeneous features, predicted future homogeneous spam origin descriptors and time-sensitive homogeneous features to compiled domain name records; identify predicted spam origins among matched domain name records; forecast a future spam campaign to originate from the predicted spam origins; and configure a mail proxy server to block future emails from the predicted spam origins.

Spam originators can mass-acquire domain names for a future spam campaign within one day or less time from the time of sending spam emails. Therefore, according to example embodiments of the present disclosure, the periodic compilation of domain name records should be performed as frequently as a daily basis, for timely forecasting of future spam campaigns before they occur. To be reliable for this purpose, the compiled domain name records should include information of domains registered the same day of retrieval or day(s) immediately preceding the day of retrieval.

However, domain name files are generally protected from public access due to high likelihood of such public access being abused. Interested parties in querying new domain name registrations can run software applications commonly known as crawlers to access public IP addresses to identify, by brute-force, new domain name registrations; and "scrape" registration records for newly registered domain name records corresponding to the identified new registrations from individual queries to DNS hosting services. According to example embodiments of the present disclosure, domain name records can be compiled from a DNS records source in this fashion (a DNS records source being a DNS hosting service, through many individual brute-forced queries), though such brute-force scraping is generally highly intensive in computational workload and network traffic; to perform such brute-force scraping at periodic intervals, on a day-to-day basis, for the purpose of forecasting spam campaigns can inordinately consume computational and network resources of an enterprise system 102.

Service providers, herein referenced as "DNS registration aggregators," actively perform brute-force scraping as described above and aggregate the scraped domain registration records for public access, in exchange for service fees. According to example embodiments of the present disclosure, domain name records can be compiled from a DNS records source in this fashion (a DNS records source being a DNS registration aggregator), though access to such aggregated records is generally not priced cost-effectively for periodic retrieval, and there is no guarantee of the aggregated records being frequently updated, so such records may not be reliable for timely forecasting of future spam campaigns.

Additionally, since TLDs can be a homogeneous feature according to example embodiments of the present disclosure, domain name records can be compiled from a DNS records source where a DNS records source is a TLD zone file of a TLD registry. Such TLD zone files can be retrieved from, for example, the Centralized Zone Data Service maintained by the Internet Corporation for Assigned Names and Numbers ("ICANN"). Although the TLD zone file for a common TLD such as .com can be massive in size, totaling tens of gigabytes, the centralized nature of a such a TLD zone file facilitates the compilation of domain name records from an up-to-date source according to example embodiments of the present disclosure, and the expression matching of such domain name records according to example embodiments of the present disclosure (as shall be described subsequently) facilitates the prediction of spam origins.

Illustrative Computing Device

FIG. 2 is a block diagram depicting an example computing device configured to participate in a spam forecasting system and method according to various examples described herein.

FIG. 2 is an illustrative diagram that shows an example configuration of components of a computing device 200, which can represent a computing device(s) 104, and which can be a part of and/or implement a spam forecasting system, device, and/or apparatus, according to various examples described herein. Example computing device 200 includes one or more processing unit(s) 202, network interface(s) 204, input interface(s) 206, output interface(s) 208, and computer-readable media 210. The components of computing device 200 are operatively connected, for example, via a bus 212. These components can represent corresponding components from device(s) 104 a, e.g., processing unit(s) 202 can represent processing unit(s) 114, 134, bus 212 can represent bus 118, 138, etc.

In example computing device 200, processing unit(s) 202 can correspond to processing unit(s) 114, 134, and can represent, for example, a CPU-type processing unit, a GPU-type processing unit, a field-programmable gate array (FPGA), another class of digital signal processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-chip systems (SOCs), Complex Programmable Logic Devices (CPLDs), etc. In some examples, processing unit(s) 202 can include an on-board memory, e.g., a RAM and/or cache, not shown.

Network interface(s) 204, which can correspond to communications interface(s) 128, 148, can represent, for example, network interface controllers (NICs) or other types of transceiver devices to send and receive communications over a network.

Input/output (I/O) interfaces 206 and 208, respectively, allow computing device 200 to communicate with input/output devices such as user input devices including peripheral input devices (e.g., a keyboard, a mouse, a pen, a game controller, a voice input device, a touch input device, a gestural input device, and the like) and/or output devices including peripheral output devices (e.g., a display, a printer, audio speakers, a haptic output, and the like). Input/output (I/O) interfaces 206 and 208, respectively, can correspond to user interface(s) 130, 150.

Computer-readable media 210 can correspond to computer-readable media 116, 136, and can store instructions executable by the processing unit(s) 202. Computer-readable media 210 can also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in computing device 200, while in some examples one or more of a CPU, GPU, and/or accelerator is external to computing device 200.

In the illustrated example, computer-readable media 210 includes spam-control program 214, which can correspond to spam forecasting program 122 and/or mail scanning program 142. Computer-readable media 210 includes one or more datastore(s) 216, which can correspond to datastore(s) 126, 146.

In various examples, datastore(s) 216 can include data storage such as a database, data warehouse, or other type of structured or unstructured data storage (e.g., a Structured Query Language, SQL, an RDS PostgreSQL database, and/or NoSQL database), a Dynamo database, an S3 storage, etc. In some examples, datastore(s) 216 can include a corpus and/or a relational database with one or more tables, indices, stored procedures, and so forth to enable data access including one or more of hypertext markup language (HTML) tables, resource description framework (RDF) tables, web ontology language (OWL) tables, and/or extensible markup language (XML) tables, for example. Datastore(s) 216 can store data for the operations of processes, applications, components, and/or modules stored in computer-readable media 210 and/or executed by processing unit(s) 202 and/or accelerator(s). For example, datastore(s) 216 can store data that from DNS records, e.g., IP addresses, domains, top-level domain(s) (TLD) with associated subdomain(s), CNAME, MX records, etc. Such DNS records can include compiled domain name records, retrieved in one of the fashions as described above and as further elaborated upon below.

In various examples, spam-control program 214 can include a variety of modules to implement the program. For example, spam-control program 214 can include a domain compiling module 218, a domain processing module 220, and a domain list distributing module 222. In some examples, spam-control program 214 can include one or more of a campaign determining module 224, a homogeneous feature identifying module 226, a heterogeneous feature identifying module 228, a descriptor predicting module 230, an expression writing module 232, and/or a scanner configuring module 234.

Illustrative Results

FIG. 3 is a diagram illustrating example results of applying publicly available intelligence to spam forecasting measures as described herein.

By running a spam forecasting system according to example embodiments of the present disclosure as part of an enterprise system 102, the spam forecasting system periodically, on a daily basis, performed the steps of compiling domain name records from a DNS records source, predicting future homogeneous spam origin descriptors, identifying predicted spam origins, and configuring a mail proxy server to block future emails from the predicted spam origins as described below. Vertical bars indicate numbers of predicted spam origins identified by the spam forecasting system, measured in numbers of unique domains included in a domain list generated based on the predicted spam origins (as described below). Lines indicate numbers of email messages blocked by configuring proxy servers of the enterprise system to block sending domains based on the domain list. It can be seen according to FIG. 3 that number of messages blocked reaches hundreds of thousands on several distinct days; such extremely high volumes of email messages correspond to one or more spam floods. It can be seen that trends numbers of predicted spam origins generally mirrors trends in numbers of email messages blocked, meaning that the number of domains blocked is generally proportional compared to high volumes of email messages during spam floods (whenever the number of emails blocked are in the hundreds of thousands). Consequently, it can be seen that a spam forecasting system according to example embodiments of the present disclosure performs in a responsive and a timely manner day to day, proportional to the occurrence of actual spam floods.

Illustrative Processes

The order in which the operations are described in each example flow diagram and/or process is not intended to be construed as a limitation, and any number of the described operations can be combined in any order and/or in parallel to implement each process. Moreover, the operations in each of FIGS. 4, 5A, 5B, and 5C can be implemented in hardware, software, and/or a combination thereof. In the context of software, the operations represent computer-executable instructions that, when executed by one or more processors, cause one or more processors to perform the recited operations. In the context of hardware, the operations represent logic functions implemented in circuitry, e.g., datapath-control and finite-state-machine sequencing functions.

Figure 4:
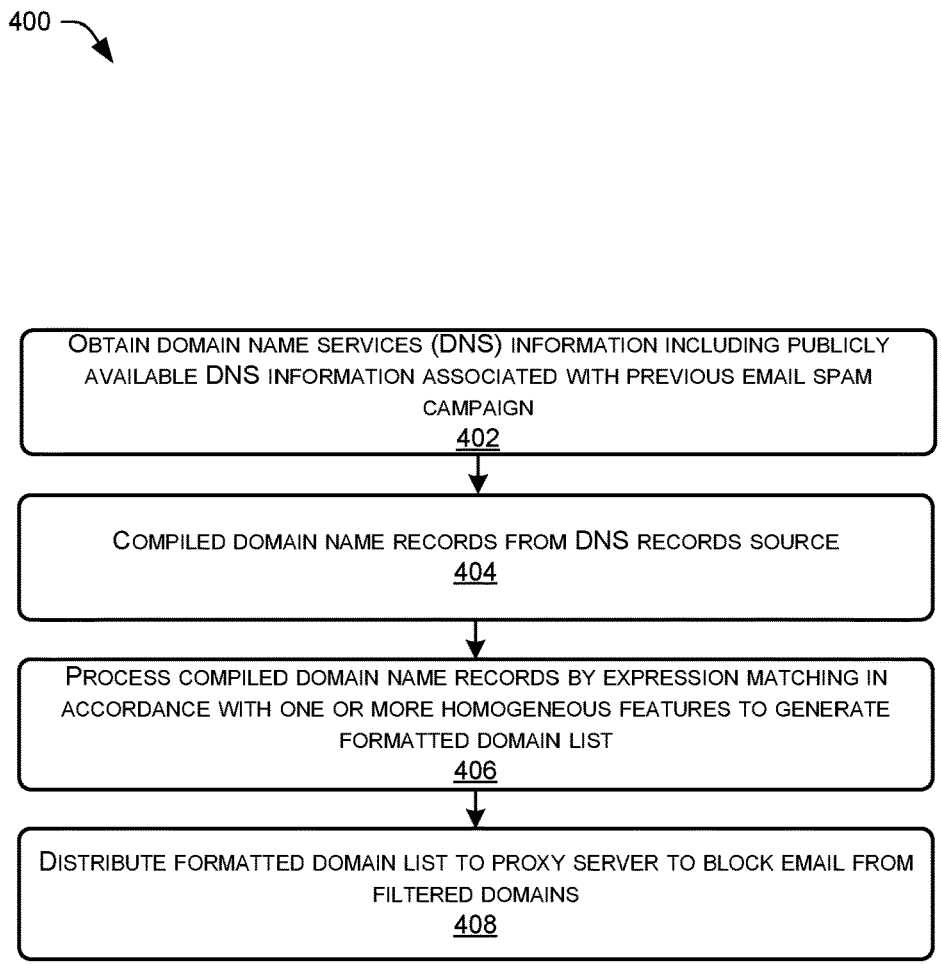
FIG. 4 is a flow diagram that illustrates an example process associated with applying publicly available intelligence to spam forecasting as described herein.

FIG. 4 is a flow diagram that illustrates an example process 400 associated with a spam forecasting system, e.g., one or more computing device(s) 200 including spam-control program 214 for applying publicly available intelligence to spam forecasting measures as described herein.

At block 402, components of a spam forecasting system including one or more computing device(s) 200 can obtain domain name services (DNS) information including publicly available DNS information associated with a past spam campaign. For example, an input interface 206 can receive instructions executed by one or more processor(s) 202 to perform execution of a query for DNS information associated with a past spam campaign; a network interface 204 can provide the query to one or more network-connected computers such as DNS server(s) 108 and receive DNS information in reply to the query; and one or more datastore(s) 216 can store at least a part of the received DNS information associated with the past spam campaign. In at least one example, the instructions executed by one or more processor(s) 202 to perform execution of a query for DNS information associated with the past spam campaign include instructions to perform a query on DNS information associated with a past spam campaign stored in one or more datastore(s) 216. In various examples, an output interface 208 can provide an indication that DNS information associated with a past spam campaign has been obtained.

At block 404, components of a spam forecasting system including a spam-control program 214 can compile domain name records from a DNS records source. For example, domain compiling module 218 can be configured to crawl public IP addresses; configured to, based on new domain name registrations identified from crawled public IP addresses, query each domain registration to retrieve a corresponding domain name record from one or more DNS hosting services; and configured to compile each retrieved domain name record. Alternatively, domain compiling module 218 can be configured to query a DNS registration aggregator to retrieve aggregated domain name records. Alternatively, domain compiling module 218 can be configured to query a TLD registry to retrieve a TLD zone file.

For example, domain compiling module 218 can be configured to connect to a File Transfer Protocol ("FTP") server of a TLD registry in accordance with FTP protocol, request a TLD zone file located at a specified path and filename, and download the requested TLD zone file in accordance with FTP protocol. Domain compiling module 218 can be further configured to extract the retrieved zone file from a compressed format, such as the gzip format as known to persons skilled in the art.

At block 406, components of a spam forecasting system including a spam-control program 214 can process the compiled domain name records by expression matching in accordance with one or more homogeneous features to generate a formatted domain list. For example, domain processing module 220 can be configured to search the compiled domain name records for each domain name record matching a domain matching expression written by an expression writing module 230 as described subsequently. The domain processing module 220 can perform such a search by, for example, running the Unix grep utility as known to persons skilled in the art using a domain matching expression as an argument. The expression writing module will have written the domain matching expression in accordance with an expected format of the compiled domain name records, as shall be described subsequently. Each matching domain name record can be output by the search as a line of text from the compiled domain name records, the line of text containing at least a domain name including subdomain names.

Furthermore, domain processing module 220 can be configured to extract domain names of each domain name record. The domain processing module 220 can perform such extraction by, for example, running the Unix cut utility as known to persons skilled in the art upon each matching domain name record output by the above-described search.

Furthermore, domain processing module 220 can be configured to sort domain names of each domain name record. The domain processing module 220 can perform such sorting by, for example, running the Unix sort utility as known to persons skilled in the art upon each extracted domain name as above.

Furthermore, domain processing module 220 can be configured to format the sorted domain names in accordance with blacklist formats of mail servers. The domain processing module 220 can perform such formatting by, for example, running the Unix sed utility as known to persons skilled in the art upon each domain name, formatting the domain name as a blacklist entry in accordance with a blacklist format of a mail server of the enterprise system 102. For example, the blacklist format can be in accordance with the open-source Postfix standard for mail server configuration, wherein mail from a domain can be blocked by the inclusion of a line of text containing the domain name and the characters REJECT. The domain processing module 220 can further perform such formatting by running the Unix column utility as known to persons skilled in the art upon each formatted domain name to output the blacklist entry in columns, and the like.

At block 408, components of a spam forecasting system including a spam-control program 214 can distribute the formatted domain list to a proxy server 104(3) to block email from the filtered domains. For example, a domain list distributing module 222 can be configured to propagate the formatted domain list to each proxy server 104(3) at a preconfigured file path and file name.

It should be understood that, according to mail server configuration standards, a mail scanning program 142 running on one or more proxy servers 104(3) can be configured to scan and to block inbound mail to the mail server according to more than one blacklist. Some blacklists can be conventionally populated based on reputation, content, and the like, and can configure the mail scanning program to block inbound mail according to sender email addresses, according to domains in sender email addresses, according to sender IP addresses, or according to other rules as known to persons skilled in the art. Some blacklists can be updated by distributing incrementally updated blacklists to proxy servers 104(3), where updated blacklists include all previously existing blacklist entries. In contrast, a "flood domain list," according to example embodiments of the present disclosure, should be understood as a domain list configuring the mail scanning program to block inbound mail according to domains in sender email addresses, and, furthermore, should be understood as a domain list which the mail scanning program is configured to update by overwriting a previous flood domain list entirely with a newly distributed flood domain list, causing loss of all entries included in a previous flood domain list.

Domain lists, being expansive in scope, can be recorded, updated, and enforced more efficiently than lists of individual addresses. Additionally, domain lists overcome shortcomings of certain mail server standards, which can limit the number of individual addresses which can be blocked; such limits are generally much smaller than the number of sending domains alone which can be deployed in a spam flood, numbering in the tens of thousands in practice.

The domain list distributing module 222 being configured to distribute a domain list which destructively replaces previous flood domain lists reflects the understanding that predicted spam origins can be transient in nature; in order to evade conventional spam blocking rules, a spam originator may not intend to reuse the spam origin domain names for repeated spam campaigns. Consequently, a flood domain list may not need to be retained on a long-term basis, and, upon the prediction of a new set of spam origin domain names, a previously predicted set of spam origin domain names are no longer relevant, and a previous flood domain list containing the previously predicted set of spam origin domain names can be discarded in its entirety.

The domain list distributing module 222 being configured to distribute a domain list which destructively replaces previous flood domain lists also reflects the understanding that domain lists are a highly expansive spam blocking measure and should be deployed sparingly and cautiously. Since a spam originator does not intend to reuse the spam origin domain names for repeated spam campaigns, the spam originator may subsequently relinquish control of former spam origin domain names, and benign registrants may later gain control of any number of such domain names. Discarding previous flood domain lists ensures that domain lists do not remain in place longer than necessary, to avoid subsequently blocking benign emails from the same domains.

FIGS. 5A, 5B, and 5C illustrate example processes associated with applying publicly available intelligence to spam forecasting in some instances described herein. In various examples, one or more of processes illustrated in FIGS. 5A, 5B, and 5C can be included in the process of block 404.

At block 502, FIG. 5A, components of a spam forecasting system including a spam-control program 214 can determine email samples of a past spam campaign. For example, a campaign determining module 224 can be configured to identify that a large volume of emails received by mail servers of the enterprise system 102 within a short span of time describe a past spam campaign.

At block 504, FIG. 5B, components of a spam forecasting system including a spam-control program 214 can identify one or more homogeneous features across email samples, including intra-campaign samples and/or inter-campaign samples. After identifying one or more homogeneous features across a set of intra-campaign email samples, particularly a statistically less probable homogeneous feature, the spam-control system 214 can further identify one or more additional homogeneous features as well as one or more systematically heterogeneous features. The spam-control program 214 can identify a set of email samples as substantially homogeneous based on identifying at least one homogeneous feature across the set of email samples and at least one systematically heterogeneous feature across the set of email samples.

For example, a homogeneous feature identifying module 226 can be configured to determine that a first set of recipient addresses in email samples of a first past spam campaign are substantially homogeneous with a second set of recipient addresses in email samples of a second past spam campaign. It may be statistically less probable for invalid recipient addresses in each set of recipient addresses to be substantially homogeneous. The spam forecasting program 122 can be configured to extract the first set of recipient addresses and the second set of recipient addresses and can be configured to compare members of the two sets to determine that they are substantially homogeneous or that they are not.

For example, the homogeneous feature identifying module 226 can be configured to determine that a TLD in sender addresses is substantially homogeneous across intra-campaign samples of a same past spam campaign and can be configured to determine that a TLD in sender addresses is substantially homogeneous across inter-campaign samples of different past spam campaigns. The spam forecasting program 122 can be configured to extract a set of TLDs from sender addresses across one or more past spam campaigns and can be configured to determine whether this set includes only one unique member (i.e., the TLD is substantially homogeneous) or several (i.e., this TLD is not substantially homogeneous). According to example embodiments of the present disclosure, this can be a homogeneously origin-referencing feature which can indicate that domain names mass-acquired having this common TLD can be predicted to be spam origins in the future.

For example, a heterogeneous feature identifying module 228 can be configured to determine that domain names in sender addresses are systematically heterogeneous across intra-campaign samples and inter-campaign samples in containing non-dictionary words. The spam forecasting program 122 can be configured to extract domain names from sender addresses and determine whether each domain name is made up of one or more dictionary words, or whether a domain is not made up of dictionary words. The spam forecasting program 122 can be further configured to fuzzy match a domain name against one or more dictionary words from which the domain name differs by a small edit distance (which can indicate a purposeful misspelling); upon performing such fuzzy matching across email samples, the spam forecasting program 122 can determine that the email samples are or are not systematically heterogeneous in domain names containing non-dictionary words.

For example, the heterogeneous feature identifying module 228 can be configured to determine that domain names in sender addresses are systematically heterogeneous across intra-campaign samples and inter-campaign samples in mismatching email body content. The spam forecasting program 122 can be configured to extract keywords from an email body (in accordance with natural language processing, summarization, and such techniques as known to persons skilled in the art) and semantically match extracted keywords with words in a sender address domain name of the same email, or semantically match extracted keywords with dictionary words fuzzy-matched to words in the sender address domain name of the same email (in the event that the sender address domain name includes no dictionary words).

For example, the heterogeneous feature identifying module 228 can be configured to determine that domain names in sender addresses are systematically heterogeneous across intra-campaign samples and inter-campaign samples in their inclusion of heterogeneous subdomains. The spam forecasting program 122 can be configured to extract a set of subdomains from sender addresses across one or more past spam campaigns and can be configured to determine whether this set includes many unique members (i.e., the subdomains are systematically heterogeneous) or few (i.e., the subdomains are not systematically heterogeneous).

FIG. 5C is a flow diagram that illustrates an example process 500 associated with applying publicly available intelligence to spam forecasting in which components of a spam forecasting system including a spam-control program 214 can predict homogeneous spam origin descriptors based on domain name records and by deriving homogeneously origin-referencing features by comparing substantially homogeneous email samples against the domain name records.

At block 506, components of a spam forecasting system including a spam-control program 214 can be configured to compare origin-referencing features of substantially homogeneous email samples against domain name records to determine homogeneously origin-referencing features and predict future homogeneous spam origin descriptors. As described above, domain compiling module 218 can have compiled domain name records from a DNS records source. The spam-control program 214 can have determined a set of substantially homogeneous email samples, as described above with reference to block 504. A descriptor predicting module 230 can be configured to extract origin-referencing features from the set of email samples, such as extracting sending domains from sending addresses of each email sample. The spam-control program 214 can be configured to match these extracted origin-referencing features against the compiled domain name records, to determine that the origin-referencing features are homogeneously origin-referencing features. For example, the spam-control program 214 can be configured to determine that the extracted sending domains from sender addresses were all registered at a common domain name registrar according to the domain name records. Thus, the sending domains are homogeneously origin-referencing features in referencing a common domain name registrar. Based on this, the spam-control program 214 can be configured to predict that domain names mass-registered at this same domain name registrar in the future will be future homogeneous spam origins.

At block 508, components of a spam forecasting system including a spam-control program 214 can write domain matching expressions based on homogeneously origin-referencing features, based on predicted future homogeneous spam origin descriptors, and based on time-sensitive homogeneous features. For example, an expression writing module 232 can be configured to write a regex expression which matches domain names and domain name registrars listed in entries of a domain zone file according to a known format, such as a TLD zone file according to the known format of the .com TLD zone file maintained by VERISIGN INC. of Reston, VA.

Moreover, the expression writing module 232 can be configured to write a regex expression which matches a domain name and a domain name registrar listed in an entry of a domain zone file. A domain name registrar to be matched can correspond to a predicted future homogeneous spam origin descriptor describing unspecified domain names mass-registered at a particular domain name registrar; i.e., it is expected that entries of the domain zone file should at least match the particular domain name registrar in order to correspond to a predicted future homogeneous spam origin descriptor, though such a match alone is not sufficient. The expression writing module 232 can be configured to write multiple domain matching expressions corresponding to multiple domain name registrars, each registrar being part of a different future spam origin prediction.

In some examples, a domain name to be matched can correspond to a homogeneously origin-referencing feature. For example, the expression writing module 232 can be configured to write a regex expression which matches a domain name including the .com TLD according to a homogeneously origin-referencing feature; i.e., it is expected that entries of the domain zone file should at least include the .com TLD in order to correspond to a predicted future homogeneous spam origin descriptor, though such a match alone is not sufficient.

A domain name to be matched can correspond to a time-sensitive homogeneous feature. For example, the expression writing module 232 can be configured to write a regex expression which matches a default name server of a domain name registrar; i.e., it is expected that entries of the domain zone file should be "parked," that is, directed to a default name server of the registrar, as an indicator of having been recently mass-acquired for a future spam campaign, and therefore in order to be indicated as corresponding to a predicted future homogeneous spam origin descriptor. The expression writing module 232 can be configured to write multiple domain matching expressions corresponding to multiple default name servers, each default name server being a publicly known default name server of a registrar which is part of a future spam origin prediction.

Therefore, entries of domain name records matching a domain matching expression can be indicated as predicted future homogeneous spam origin descriptors due to these entries all referencing domains mass-acquired from a particular domain name registrar (possibly one out of several particular domain name registrars) and all left in a parked state pointing to default name servers of the domain name registrar. In the event that a statistically improbably high number of such domain name records are matched (which may number in the tens of thousands or more), this should be considered a forecast of a future spam campaign to originate from domains matching the domain name records, according to example embodiments of the present disclosure. Either condition above, by itself, may not be sufficient to indicate these domains as predicted future spam origins.

Thus, the domain processing module 220, as described above, can use these domain matching expressions to search compiled domain name records and, upon matching a large number of domain name records, generate formatted domain lists on the basis that a future spam campaign has been forecast.

At block 510, components of a spam forecasting system including a spam-control program 214 can configure a mail scanner running on a proxy server to block emails according to a distributed domain list. At each proxy server 104(3), a scanner configuring module 234 can configure a locally running mail scanning program 142 to replace a flood domain list with the distributed domain list in accordance with a configuration standard of a mail server of the enterprise system 102, such as the Postfix standard.

CONCLUSION

Although the techniques have been described in language specific to structural features and/or methodological acts, it is to be understood that the appended claims are not necessarily limited to the features and/or acts described. Rather, the features and acts are described as example implementations of such techniques. For example, network 106, processing unit(s) 134, and other structures described herein for which multiple types of implementing devices or structures are listed can include any of the listed types, and/or multiples and/or combinations thereof.

The operations of the example processes are illustrated in individual blocks and summarized with reference to those blocks. The processes are illustrated as logical flows of blocks, each block of which can represent one or more operations that can be implemented in hardware, software, and/or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that can configure a processor to perform particular functions and/or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more computing device(s) 104 such as one or more internal and/or external CPUs and/or GPUs, and/or one or more pieces of hardware logic such as FPGAs, DSPs, and/or other types described above.

All of the methods and processes described above can be embodied in, and fully automated via, software code modules executed by one or more general-purpose computer(s) and/or processor(s) thereby reconfiguring the general-purpose computer(s) and/or processor(s) as special purpose computer(s) and/or processor(s) during their execution. The code modules can be stored in any type of computer-readable storage medium and/or other computer storage device. Some and/or all of the methods can be embodied in specialized computer hardware.

Conditional language such as, among others, "can," "could," "might" and/or "may," unless specifically stated otherwise, are understood within the context to present that certain examples include, while other examples need not include, certain features, elements and/or steps. Thus, such conditional language is not generally intended to imply that certain features, elements and/or steps are in any way required for one or more examples and/or that one or more examples necessarily include logic for deciding, with and/or without user input and/or prompting, whether certain features, elements and/or steps are included and/or are to be performed in any particular example. The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or any combination thereof.

Any routine descriptions, elements and/or blocks in the flow diagrams described herein and/or depicted in the attached figures should be understood as potentially representing modules, segments, and/or portions of code that include one or more executable instructions for implementing specific logical functions and/or elements in the routine. Alternative implementations are included within the scope of the examples described herein in which elements and/or functions can be deleted and/or executed out of order from any order shown or discussed, including substantially synchronously and/or in reverse order, depending on the functionality involved as would be understood by those skilled in the art. It should be emphasized that many variations and modifications can be made to the above-described examples, the elements of which are to be understood as being among other acceptable examples. All such modifications and variations are intended to be included herein within the scope of this disclosure and protected by the following claims. Moreover, in the claims, any reference to a group of items provided by a preceding claim or clause is a reference to at least some and not necessarily all of the items in the group of items, unless specifically stated otherwise.

What is claimed is:

1. A system comprising:
one or more processing units; and
one or more non-transitory computer-readable media storing computer-executable instructions that, when executed by the one or more processing units, configure the one or more processing units to perform operations to forecast an email spam campaign comprising:
receiving a set of homogeneous email samples associated with a first set of domain name records generated at a first time;
receiving a second set of domain name records generated at a second time, wherein the second time is after the first time;
comparing first origin-referencing features of the first set of domain name records against second origin-referencing features of the second set of domain name records to predict homogeneous spam origin descriptors, wherein:
the first origin-referencing features comprise;
a plurality of domain names comprising at least one of one or more domain names directed to a default domain name server or one or more domain names previously directed to the default domain name server, and
a first domain name of the plurality of domain names determined to be directed to a domain names server for less than a threshold period of time after being previously directed to the default domain name server, and the second origin-referencing features comprise a second domain name associated with the first domain name; and
matching the predicted homogeneous spam origin descriptors against the second set of domain name records to identify predicted spam origins among matched domain name records.

2. The system as claim 1 recites, wherein the operations further comprise:
determining email samples of a past spam campaign;
identifying one or more homogeneous features across a set of the email samples;
identifying one or more systematically heterogeneous features across the set of the email samples; and
identifying the set of the email samples as homogeneous.

3. The system as claim 2 recites, wherein the past spam campaign is a first past spam campaign, and the one or more homogeneous features comprises at least one of:
a first set of recipient addresses in the email samples of the first past spam campaign being homogeneous with a second set of recipient addresses in email samples of a second past spam campaign;
a top-level domain (TLD) in first sender addresses being homogeneous across intra-campaign samples of a same past spam campaign; or
a TLD in second sender addresses being homogeneous across inter-campaign samples of different past spam campaigns.

4. The system as claim 2 recites, wherein the one or more systematically heterogeneous features comprises at least one of:
first domain names in first sender addresses being systematically heterogeneous across first intra-campaign samples and first inter-campaign samples in containing non-dictionary words;
second domain names in second sender addresses being systematically heterogeneous across second intra-campaign samples and second inter-campaign samples in mismatching email body content; or
third domain names in third sender addresses being systematically heterogeneous across third intra-campaign samples and third inter-campaign samples in including heterogeneous subdomains.

5. The system as claim 1 recites, wherein the operations further comprise:
compiling the first set of domain name records in accordance with one or more homogeneously origin-referencing features of the set of homogeneous email samples as compiled domain records; and
determining additional homogeneously origin-referencing features based on comparing the second origin-referencing features against the compiled domain name records.

6. The system as claim 1 recites, wherein the operations further comprise generating domain matching expressions based on predicted future homogeneous spam origin descriptors, wherein matching the predicted homogeneous spam origin descriptors against the second set of domain name records comprises applying the domain matching expressions against the second set of domain name records.

7. The system as claim 1 recites, wherein the first origin-referencing features further comprise a quantity of domain names of the plurality of domain names meeting or exceeding a threshold quantity of domain names.

8. A method comprising:
receiving a set of homogeneous email samples associated with a first set of domain name records generated at a first time;
receiving a second set of domain name records generated at a second time, wherein the second time is after the first time;
comparing first origin-referencing features of the first set of domain name records against second origin-referencing features of the second set of domain name records to predict homogeneous spam origin descriptors, wherein:
  the first origin-referencing features comprise:
    a plurality of domain names comprising at least one of one or more domain names directed to a default domain name server or one or more domain names previously directed to the default domain name server, and
    a first domain name of the plurality of domain names determined to be directed to a domain name server for less than a threshold period of time after being previously directed to the default domain name server, and the second origin-referencing features comprise a second domain name associated with the first domain name; and
matching the predicted homogeneous spam origin descriptors against the second set of domain name records to identify predicted spam origins among matched domain name records.

9. The method of claim 8, further comprising:
determining email samples of a past spam campaign;
identifying one or more homogeneous features across a set of the email samples;
identifying one or more systematically heterogeneous features across the set of the email samples; and
identifying the set of the email samples as homogeneous.

10. The method of claim 9, wherein the past spam campaign is a first past spam campaign, and the one or more homogeneous features comprises at least one of:
a first set of recipient addresses in the email samples of the first past spam campaign being homogeneous with a second set of recipient addresses in email samples of a second past spam campaign;
a top level domain (TLD) in first sender addresses being homogeneous across intra-campaign samples of a same past spam campaign; or
a TLD in second sender addresses being homogeneous across inter-campaign samples of different past spam campaigns.

11. The method of claim 9, wherein the one or more systematically heterogeneous features comprises at least one of:
first domain names in first sender addresses being systematically heterogeneous across first intra-campaign samples and first inter-campaign samples in containing non-dictionary words;
second domain names in second sender addresses being systematically heterogeneous across second intra-campaign samples and second inter-campaign samples in mismatching email body content; or
third domain names in third sender addresses being systematically heterogeneous across third intra-campaign samples and third inter-campaign samples in including heterogeneous subdomains.

12. The method of claim 8, further comprising:
compiling the first set of domain name records in accordance with one or more homogeneously origin-referencing features of the set of homogeneous email samples as compiled domain records; and
determining additional homogeneously origin-referencing features based on comparing the second origin-referencing features against the compiled domain name records.

13. The method of claim 8, further comprising generating domain matching expressions based on predicted future homogeneous spam origin descriptors, wherein matching the predicted homogeneous spam origin descriptors against the second set of domain name records comprises applying the domain matching expressions against the second set of domain name records.

14. The method of claim 8, further comprising:
generating a domain list based on the predicted spam origins;
distributing the domain list to a proxy server; and
configuring a mail scanner running on the proxy server to block emails according to the domain list.

15. One or more non-transitory computer-readable media storing computer-executable instructions that, when executed by one or more processing units, configure the one or more processing units to perform operations comprising:
receiving a set of homogeneous email samples associated with a first set of domain name records generated at a first time;
receiving a second set of domain name records generated at a second time, wherein the second time is after the first time;
comparing first origin-referencing features of the first set of domain name records against second origin-referencing features of the second set of domain name records to predict homogeneous spam origin descriptors, wherein:
  the first origin-referencing features comprise:
    a plurality of domain names comprising at least one of one or more domain names directed to a default domain name server or one or more domain names previously directed to the default domain name server, and
    a first domain name of the plurality of domain names determined to be directed to a domain name server for less than a threshold period of time after being previously directed to the default domain name server, and
  the second origin-referencing features comprise a second domain name associated with the first domain name; and
matching the predicted homogeneous spam origin descriptors against the second set of domain name records to identify predicted spam origins among matched domain name records.

16. The one or more non-transitory computer-readable media of claim 15, wherein the operations further comprise:
determining email samples of a past spam campaign;
identifying one or more homogeneous features across a set of the email samples;
identifying one or more systematically heterogeneous features across the set of the email samples; and
identifying the set of the email samples as homogeneous.

17. The one or more non-transitory computer-readable media of claim 16, wherein the past spam campaign is a first past spam campaign, and the one or more homogeneous features comprises at least one of:
a first set of recipient addresses in the email samples of the first past spam campaign being homogeneous with a second set of recipient addresses in email samples of a second past spam campaign;

a top level domain (TLD) in first sender addresses being homogeneous across intra-campaign samples of a same past spam campaign; or a TLD in second sender addresses being homogeneous across inter-campaign samples of different past spam campaigns.

18. The one or more non-transitory computer-readable media of claim 16, wherein the one or more systematically heterogeneous features comprises at least one of:

first domain names in first sender addresses being systematically heterogeneous across first intra-campaign samples and first inter-campaign samples in containing non-dictionary words;

second domain names in second sender addresses being systematically heterogeneous across second intra-campaign samples and second inter-campaign samples in mismatching email body content; or third domain names in third sender addresses being systematically heterogeneous across third intra-campaign samples and third inter-campaign samples in including heterogeneous subdomains.

19. The one or more non-transitory computer-readable media of claim 15, wherein the operations further comprising:

compiling the first set of domain name records in accordance with one or more homogeneously origin-referencing features of the set of homogeneous email samples as compiled domain records; and determining additional homogeneously origin-referencing features based on comparing the second origin-referencing features against the compiled domain name records.

20. The one or more non-transitory computer-readable media of claim 15, the operations further comprising generating domain matching expressions based on predicted future homogeneous spam origin descriptors, wherein matching the predicted homogeneous spam origin descriptors against the second set of domain name records comprises applying the domain matching expressions against the second set of domain name records.

* * * * *